United States Patent [19]
Koura et al.

[11] Patent Number: 5,369,700
[45] Date of Patent: Nov. 29, 1994

[54] MULTI-FUNCTION TELEPHONE APPARATUS AND CONTROL METHOD

[75] Inventors: Masahiro Koura; Ryuichi Ishihara; Yoshimoto Chikatsu; Yukihiko Nagata; Eihachiro Ohmori, all of Tokyo, Japan

[73] Assignee: Japan Business Systems, Inc., Tokyo, Japan

[21] Appl. No.: 869,660

[22] Filed: Apr. 16, 1992

[30] Foreign Application Priority Data

Jul. 16, 1991 [JP] Japan ................ 3-174999
Nov. 20, 1991 [JP] Japan ................ 3-304352

[51] Int. Cl.$^5$ ........................ H04M 11/00
[52] U.S. Cl. ................... 379/387; 379/201; 379/105; 379/95; 379/96; 379/97; 379/165
[58] Field of Search ........... 379/99, 387, 96, 214, 379/95, 61, 165, 201; 358/105

[56] References Cited

U.S. PATENT DOCUMENTS

| | | | |
|---|---|---|---|
| 4,363,936 | 12/1982 | Christain et al. | 379/99 |
| 4,790,004 | 12/1988 | Nalbone | 379/214 |
| 4,847,892 | 7/1989 | Shelley | 379/92 |
| 4,995,074 | 2/1991 | Goldman et al. | 379/97 |
| 5,048,080 | 9/1991 | Bell et al. | 379/165 |
| 5,140,628 | 8/1992 | Murata | 379/61 |
| 5,153,912 | 10/1992 | Sakakibara et al. | 379/96 |
| 5,260,555 | 11/1993 | Sakamoto | 235/492 |

FOREIGN PATENT DOCUMENTS

| | | |
|---|---|---|
| 0141911 | 5/1985 | European Pat. Off. . |
| 62-226761 | 5/1987 | Japan . |
| 63-26153 | 3/1988 | Japan . |
| 1068172 | 3/1989 | Japan . |
| 2214354 | 8/1990 | Japan . |
| 9107839 | 5/1991 | WIPO . |

Primary Examiner—James L. Dwyer
Assistant Examiner—Jacques M. Saint-Surin
Attorney, Agent, or Firm—Ratner & Prestia

[57] ABSTRACT

This disclosure relates to a multi-function telephone apparatus and a control method therefor. When an application program (hereinafter referred to as program) stored in an IC card is executed, a state of the program execution and an incoming/outgoing call are supervised. It is controlled in a way that the execution of the program is automatically suppressed at the time of incoming/outgoing call and restarted from the point it was suppressed when the telephone was completed. Further, when the terminal emulation program stored in the IC card emulates the telephone apparatus as a terminal of the host system, the communication with the host is efficiently executed with reduction of the line load.

14 Claims, 10 Drawing Sheets

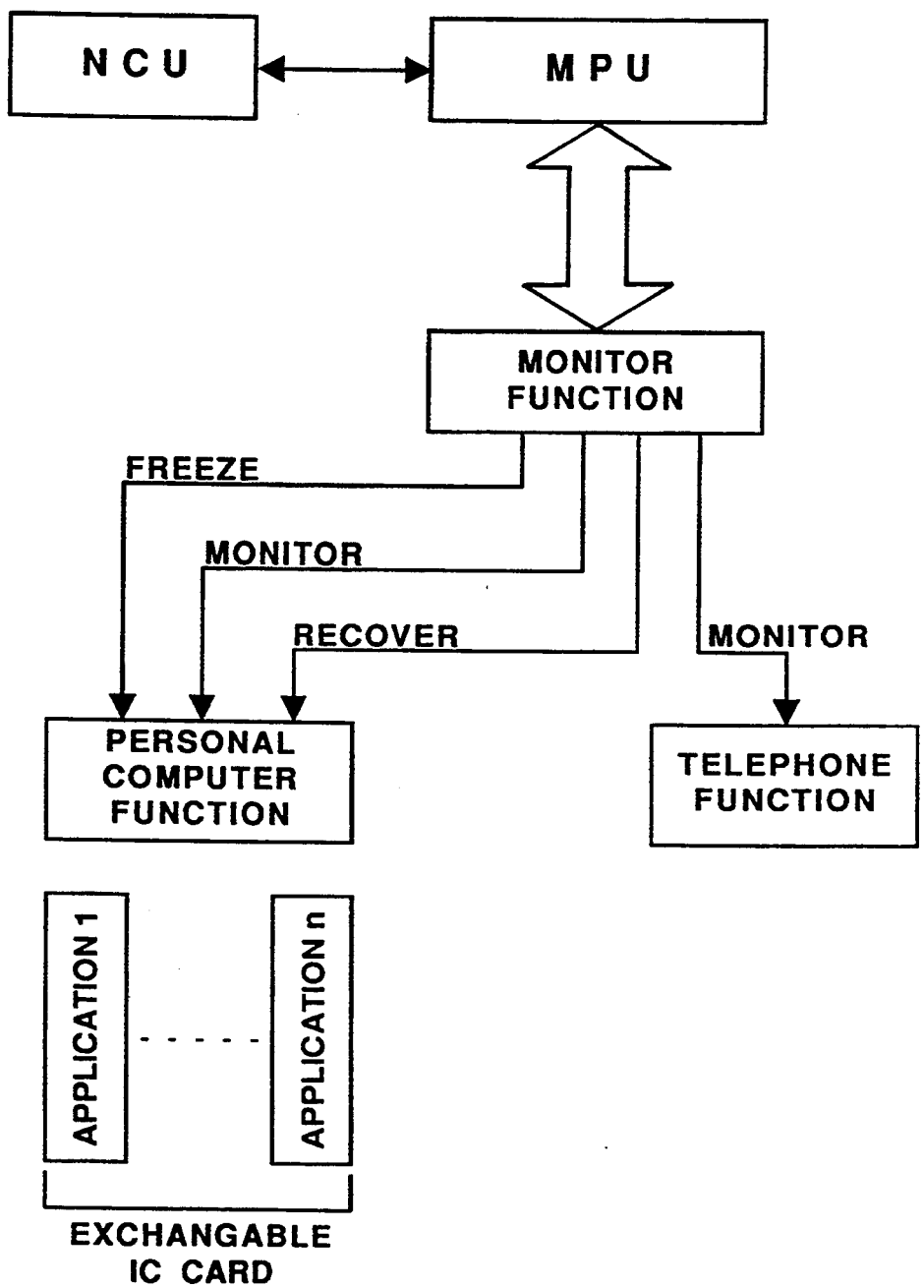
F I G. 4

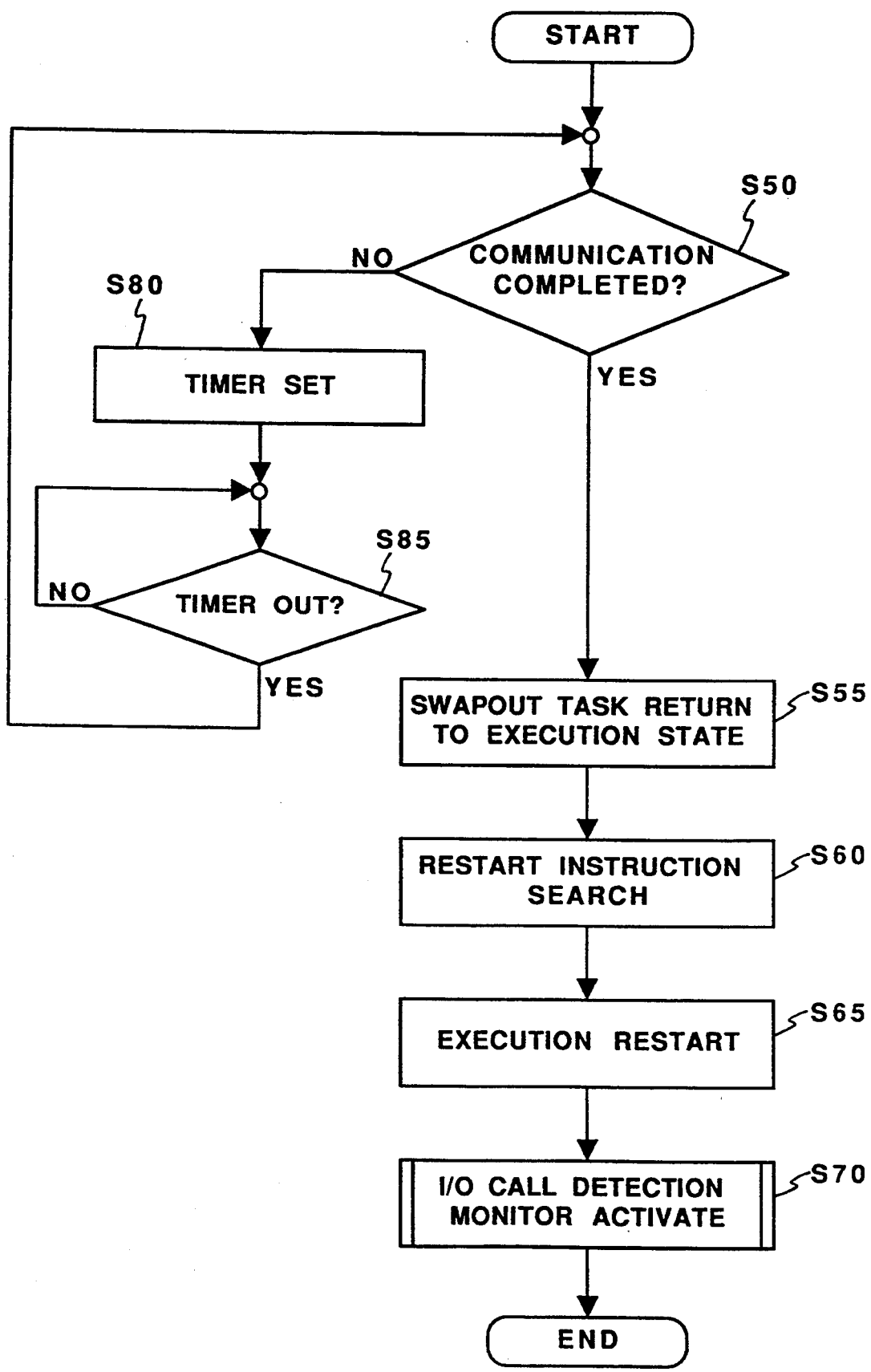
F I G. 6

MULTI-FUNCTION TELEPHONE APPARATUS AND CONTROL METHOD

BACKGROUND OF THE INVENTION

1. Field of the Invention

The present invention relates to a multi-function telephone apparatus and control method therefor, and more particularly, to a multi-function telephone apparatus which is operated as a terminal of a personal computer or a host system and to control method of the telephone apparatus.

2. Prior Art

The conventional multi-function telephone apparatuses have functions such as not-at-home response, autodial, redial, or transfer to other telephone. For these functions an MPU is employed as a controller and IC memories and microcassettes are employed for voice recording or dial recording. Further, an LCD (Liquid Crystal Display) which can display characters of several lines is attached for dial display and the like.

Recently, as home-banking and home-trading have been tried and popularized, banking transactions such as balance inquiry, remittance and transfer or stock exchange have been able to be operated by communication lines. Adjusting to this trend, some of the multi-function telephones having personal computer functions to a certain degree have been provided.

Further considering a centralized information processing system, a host computer (hereinafter referred to as "host") has been provided as a center of the system accommodating multiple terminals thereunder, which are connected to the system by the communication lines.

As a typical example of such a system, a labor management system currently adapted by many corporations will now be considered. This system is generally comprising identification cards (hereinafter referred to as "ID card") possessed by each employee, dedicated reader-writer terminals for cards accommodating an internal clock therein (hereinafter referred to as "reader-writer") and a host, which processes input information from the reader-writers. An ID card is usually a plastic card on which a magnetic stripe is attached on the backside. A photo of an employee is attached and his/her name and section are embossed on the surface of the ID.

Accordingly, the reader-writer reads information from an ID card, and inputs the time indicated by the internal clock. This time is transmitted to the host as the time that an employee arrived or gets off from the work with other managerial information recorded on the magnetic stripe. The host loads an employee's labor management program stored in an external storage device into a main storage device and waits a data reception from the reader-writer. When, the information from the reader-writer is received, the host accesses the labor management data on each employee stored in a master file and reads the data on a particular employee, and then records the time that the employee checked in/out.

In large corporations, since a host system, which processes various types of managerial information in addition to the employee's labor management, is employed for a total unitary control, a cluster machine can be provided as a dedicated system for the employees' labor management. This cluster machine can receive the labor management data on each employee and process the data.

Since a hierarchy of the host and the cluster machine described above depends on a size of a corporation or complexity of a management system, it is needless to say that a host machine and a cluster machine can be structurally combined.

In the labor management system according to the above-described structure, in the case where a plurality of offices are physically separated from each other, a plurality of reader-writer terminals are set based on the number of employees in each office. Then, the data communication between the reader-writer terminals and the host are performed through communication lines such as private lines, leased lines, or public lines. That is, whenever an input/output operation is occurred at the reader-writer terminal, data is transmitted to the cluster or the host through the communication line.

However, according to the above described art, in the case where an incoming call arrives during the time that some application program (hereinafter referred to as "application") employed for some function of the multi-function telephone apparatus was being executing, or in the case where an outgoing call was needed, the execution of the application must be interrupted. At this time, considering data integrity, the application could not be forcefully terminated and an operation following a certain procedure has been required to terminate the application.

Accordingly, to terminate or to restart the application is a troublesome operation, and it takes rather a long time to process. There is the drawback that an incoming call cannot be responded immediately. Furthermore, there is another problem arisen such that operation keys for a telephone apparatus cannot be available for an outgoing call when the application is being executed, since the operation keys are also used for application keys. That is, the operation keys are totally occupied by the application.

Now, considering the characteristics of a labor management system as a typical centralized information processing system, it can be said that input/output operations in the reader-writer terminals will be concentrated in periods immediately before the time for employees to work and after the time to get off from the work. More particularly, suppose that a typical employee's working-hour is from 9 a.m. to 5 p.m. Then, the reader-writer terminals which read ID cards become extremely busy for some minutes before 9 a.m. and after 5 p.m.

Due to the above described reason, line load and busy rate become extremely high in the periods above mentioned daily. Therefore, it is necessary to increase the number of lines and reader-writers or to prepare high quality lines capable of responding to high speed transmission in order the system to cope with such a heavy load in the busy periods. On the other hand, it is necessary for a host side to be provided with a machine capable of high throughput so that the host can process numerous input data in short time.

However, there is a problem in the above described counterplan. Since each reader-writer device is expensive, a whole system becomes costly.

Further, abrupt increase in communication line load causes delay in reading ID cards. Therefore, even if an employee arrived in time, there may be a case that the recorded time is later than the actual time that the employee checked in. This may happen because the system recognizes that the host has read the ID card after the actual time that the employee checked in. This has been a main problem complained by employees. To solve this problem, increasing the number of reader-writers or communication lines or throughput of the host becomes again on the issue. However, as described above, it cannot be easily achieved because of the cost.

The employees' labor management system has been discussed so far as an example of a centralized information processing system. However, from a point of view in the operation of the centralized information processing system, not all operations are dealing with execution of data transfer or data processing in the host at the real time. Furthermore, even from a point of view in throughput of the host or communication line load, reconsideration on data transfer is desired.

SUMMARY OF THE INVENTION

Accordingly, it is an object of the present invention to provide a telephone apparatus capable of immediate response to an incoming/outgoing call of the telephone while retaining data integrity of an application.

According to the present invention, the foregoing object is attained by providing a telephone apparatus having execution means for executing any desired programs, comprising:

detection means for detecting an incoming/outgoing call and a completion of a telephone communication; diagnosis means for diagnosing a state of program being executed by the execution means when the incoming/outgoing call is detected by the detection means; confirmation means for confirming data integrity being dealt with the program based on a result of diagnosis by the diagnosis means; freezing means for freezing execution of the program after the data integrity is confirmed by the confirmation means; and restart means for re-starting the execution of the program being suppressed by the freezing means when it is detected that the telephone communication is completed by the detection means.

It is another object of the present invention to provide a control method of the telephone apparatus capable of immediate response to an incoming/outgoing call while retaining data integrity of the application.

According to the present invention, the foregoing object is attained by providing a control method of a multi-function telephone apparatus capable of executing a certain program, comprising the steps of:

execution step which executes any desired programs; detection step which detects an incoming/outgoing call and a completion of telephone communication; diagnosis step which diagnoses a state of program execution being executed by the execution step when an incoming/outgoing call is detected by the detection step; confirmation step which confirms data integrity being dealt with the program based on a result of diagnosis by the diagnosis step; freezing step which freezes execution of the program after the data integrity is confirmed by the confirmation step; and restart step which restarts the execution of the program being suppressed by the freezing step when it is detected that the telephone communication is completed by the detection step.

In accordance with the present invention as described above, a program being executed is suppressed by an outgoing/incoming call of the telephone while preserving the data integrity and the execution of the suppressed program is restarted after the telephone communication is completed.

It is another object of the present invention to provide a telephone apparatus comprising of a function that is operated as a terminal of the host system capable of reducing a total cost of the system and efficiently utilizing communication lines on data communication with the host.

According to the present invention, the foregoing object is attained by providing a telephone apparatus having a terminal function which is operated as a terminal of a host system through a telephone line comprising:

terminal emulation means for emulating terminals under the host system; supervising means for supervising a terminal emulation by the terminal emulation means and an execution state in the communication function of the telephone apparatus; scheduling means for scheduling a communication with the host system by the terminal emulation means; controlling means for controlling the communication by the terminal emulation means in a manner such that the communication with the host system becomes on waiting by the terminal emulation means even though the communication with the host system is scheduled by the scheduling means, in case that the communication function is used by the supervising means and it is confirmed that the communication line is busy; and freezing means for freezing the communication function in the case where it is discriminated that the terminal emulation means is communicating with the host system.

It is another object of the present invention to provide a control method of the telephone apparatus having a function which is operated as a terminal of the host system capable of reducing a total cost of the system and efficiently utilizing communication lines in data communication with the host.

According to the present invention, the foregoing object is attained by providing a control method of a multi-function telephone apparatus having a function which is operated as a terminal of the host system through the telephone lines, comprising the steps of:

terminal emulation step which emulates terminals under the host system; supervising step which supervises a terminal emulation by the emulation step and an execution state in the communication function of the telephone apparatus; scheduling step which schedules a communication with the host system by the terminal emulation step; controlling step which controls the communication with the host by the terminal emulate step in a manner such that the communication with the host system becomes on waiting in the case where it is confirmed by the supervising step that the telephone line is busy, even when the communication with the host system is scheduled by the scheduling step; and freezing step which freezes the telephone communication function in the case where the communication with the host is confirmed.

In accordance with the present invention as described above, communication with the host system of the telephone apparatus, which is emulated as a terminal of the host system, is executed at scheduled time. In the case where the communication function of the telephone is occupied at that time, the communication with the host is waited, while in the case where the communicating with the host system is being executed, the telephone communication function is suppressed.

The invention is particularly advantageous because of the following reasons:

a program which is being executed can be suppressed for an incoming/outgoing call while data integrity is being preserved; one can dial freely regardless of an execution state of application program since the program can be recovered and executed after the telephone communication is completed; the communication with the host system is executed at a scheduled time without disturbing a conventional telephone communication since the communication with the host is suppressed when the communication function of the telephone is being occupied; the communication line load is distributed and efficiently used; and inexpensive terminals can be produced since the telephone is emulated as a terminal of the host system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings:

FIG. 4 is a block diagram which illustrates the constitution of the function of the telephone apparatus according to the first embodiment;

FIG. 6 is a flowchart which illustrates an application program execution recovering process at the completion of telephone communication according to first embodiment;

DESCRIPTION OF THE PREFERRED EMBODIMENTS

Preferred embodiments of the present invention will now be described in detail in accordance with the accompanying drawings.

First of all, a function of the multi-function telephone apparatus of the first embodiment which is in common with the second embodiment will be described.

Figure 1:
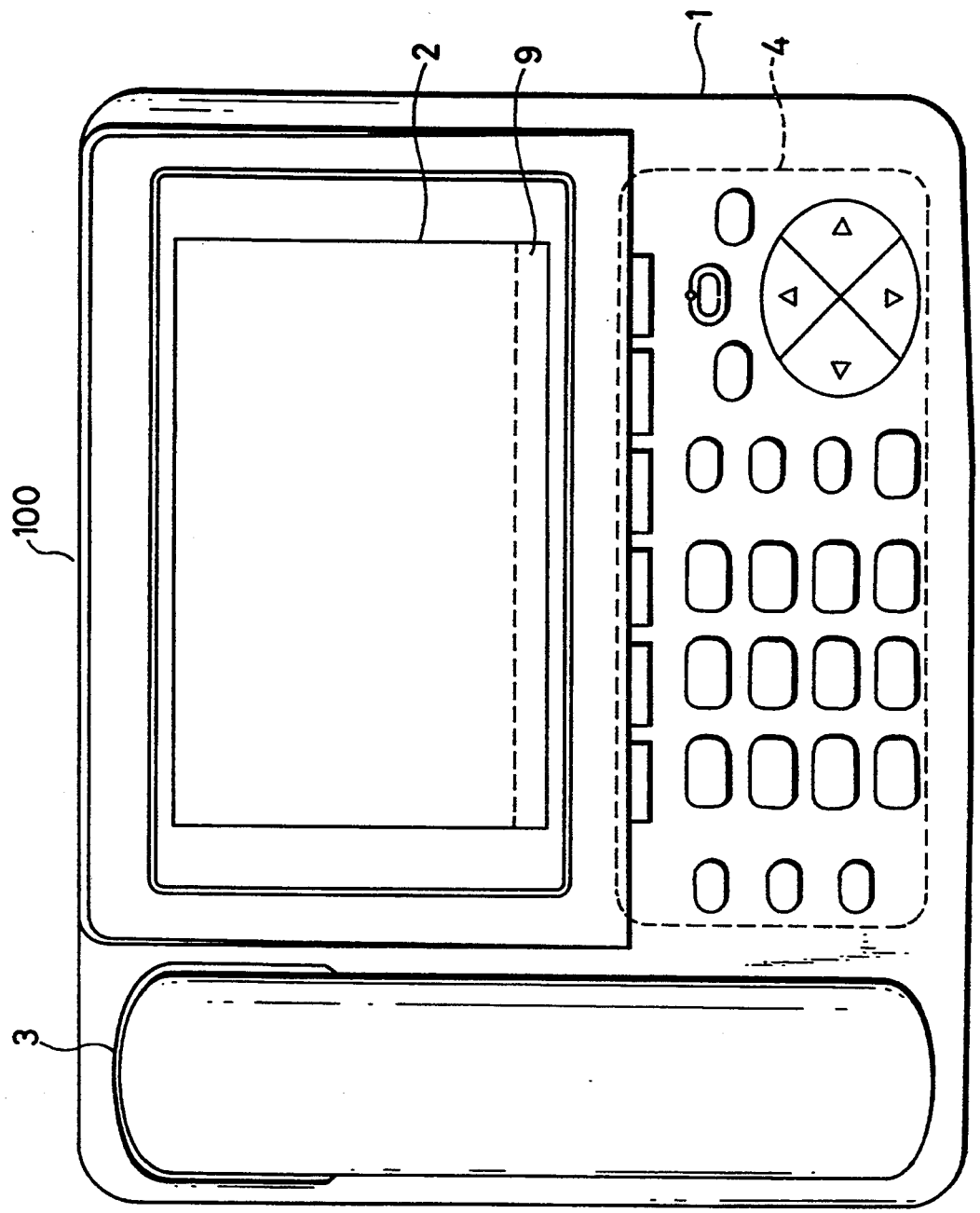
FIG. 1 is a top view of exterior of a multi-function telephone apparatus as a typical embodiment according to the present invention.
Figure 2:
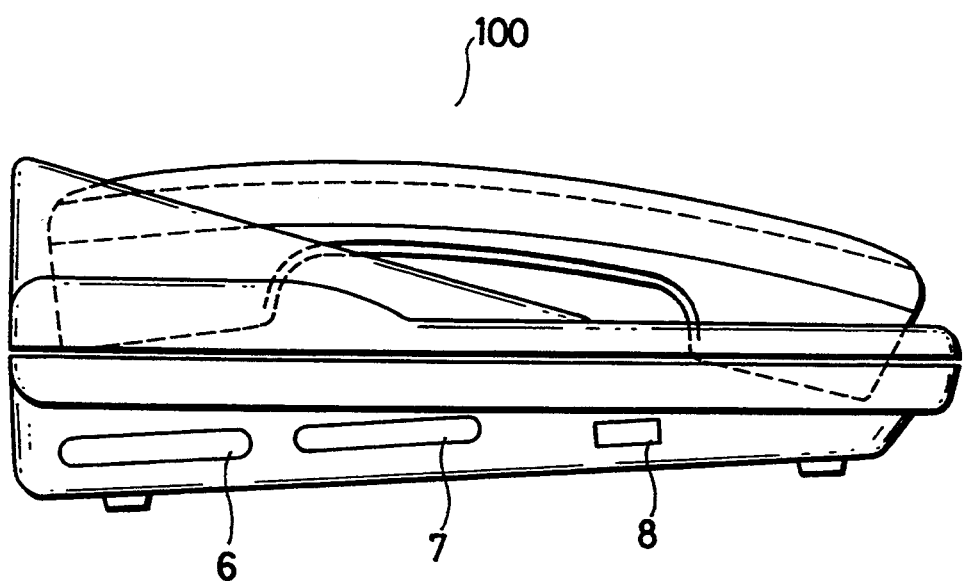
FIG. 2 is a side view of exterior of the multi-function telephone apparatus shown in FIG. 1.
Figure 3:
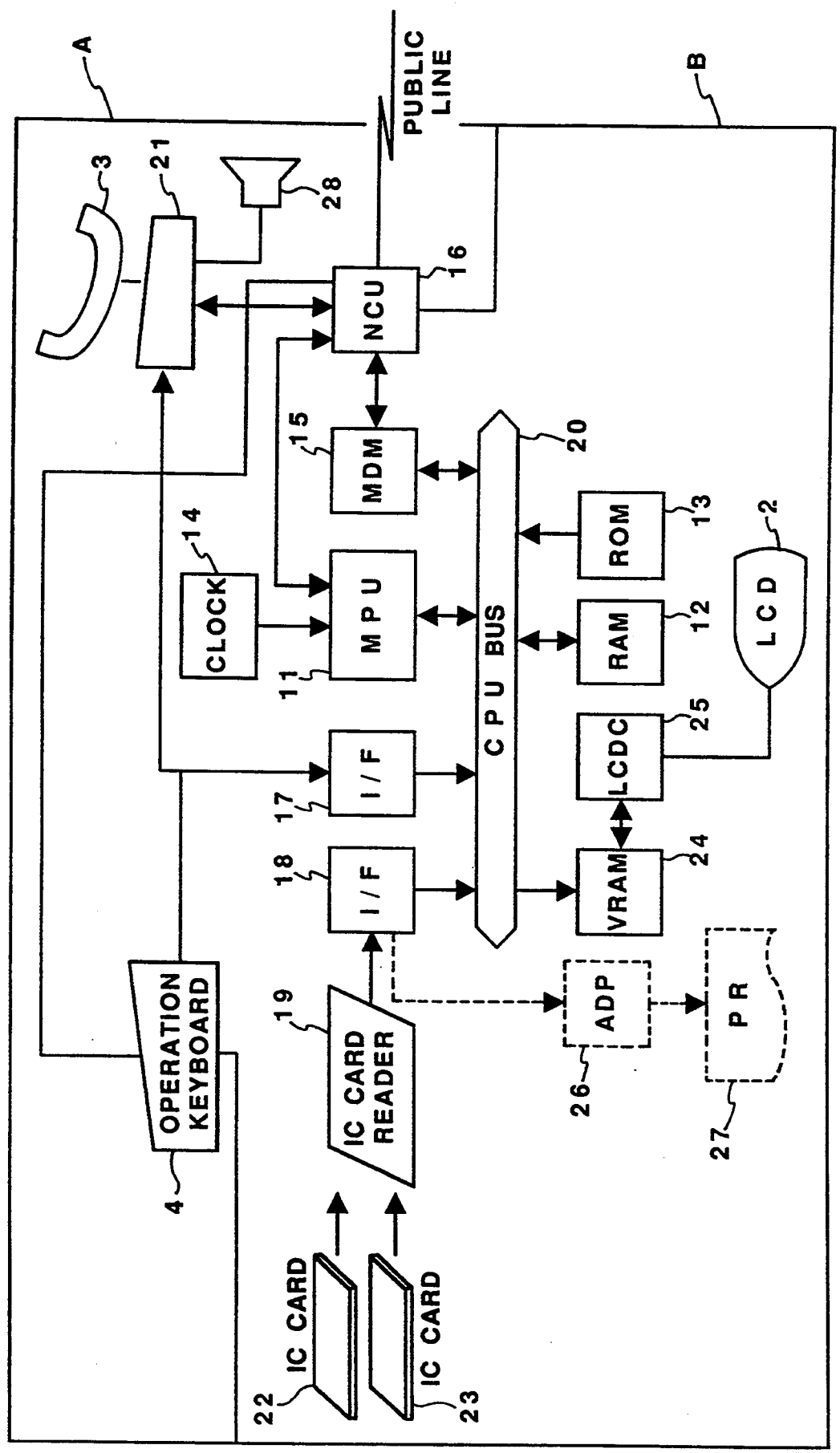
FIG. 3 is a block diagram which illustrates the constitution of a hardware of the multi-function telephone apparatus.

Constitution of Multi-Function Telephone Apparatus (FIG. 1–FIG. 3)

FIG. 1 and FIG. 2 are exterior views of a multi-function telephone apparatus 100 which is a typical embodiment according to the present invention. FIG. 1 is a top view of the telephone apparatus and FIG. 2 is a side view. In FIG. 1 and FIG. 2, reference numeral 1 is a main unit including MPU, memory and modem (MDM). Reference numeral 2 is LCD (Liquid Crystal Display), reference numeral 3 is a receiver, and reference numeral 4 is a group of keys. Reference numeral 6 and 7 are card slots and reference numeral 8 is a telephone line interface. According to the present telephone apparatus, the LCD 2 is constituted as 480 dots×320 dots. The lower part of the LCD 2, the area of 480 dots×20 dots (reference numeral 9 in FIG. 1), is used as a display area for character control and the rest of the area (480 dots×300 dots) is a display area for various kinds of information when an intelligence function of the multi-function telephone apparatus is used. External printer can be attached to the ID card slots 6 and 7 through a printer interface and information produced by the intelligence function of the multi-function telephone apparatus can be output therein.

FIG. 3 is a block diagram which illustrates the constitution of the hardware of the multi-function telephone apparatus. In FIG. 3, area A is an area of structural elements for conventional telephone functions and area B is an area of structural elements in the case where the intelligence function of the telephone is being operated. The area A (conventional telephone function) is comprising the receiver 3, part of the operation keys 4 (keys for dialing and the like), the NCU 16, a communication unit 21 and a speaker 28. The area B (intelligence function) is comprising the MPU 11, the RAM 12, the ROM 13 which stores control program to execute various types of the intelligence functions (to be described in the two embodiments), a clock 14, a modem 15, the NCU 16 (also used for telephone function), the LCD 2, the VRAM 24, the LCD controller (LCDC) 25, the operation keys 4 (also used for telephone function), an operation key interface 17, an IC card interface 18, an IC card reader 19, and a CPU bus 20 which is connected to each element. The IC card reader 19 is connected to IC cards 22–23 attached to the IC card slots 6–7 which store various kinds of application programs and data. Further, an external printer 27 can be connected to the IC card interface 18 by attaching an adaptor (ADP) 26 instead of the IC card.

Figure 5:
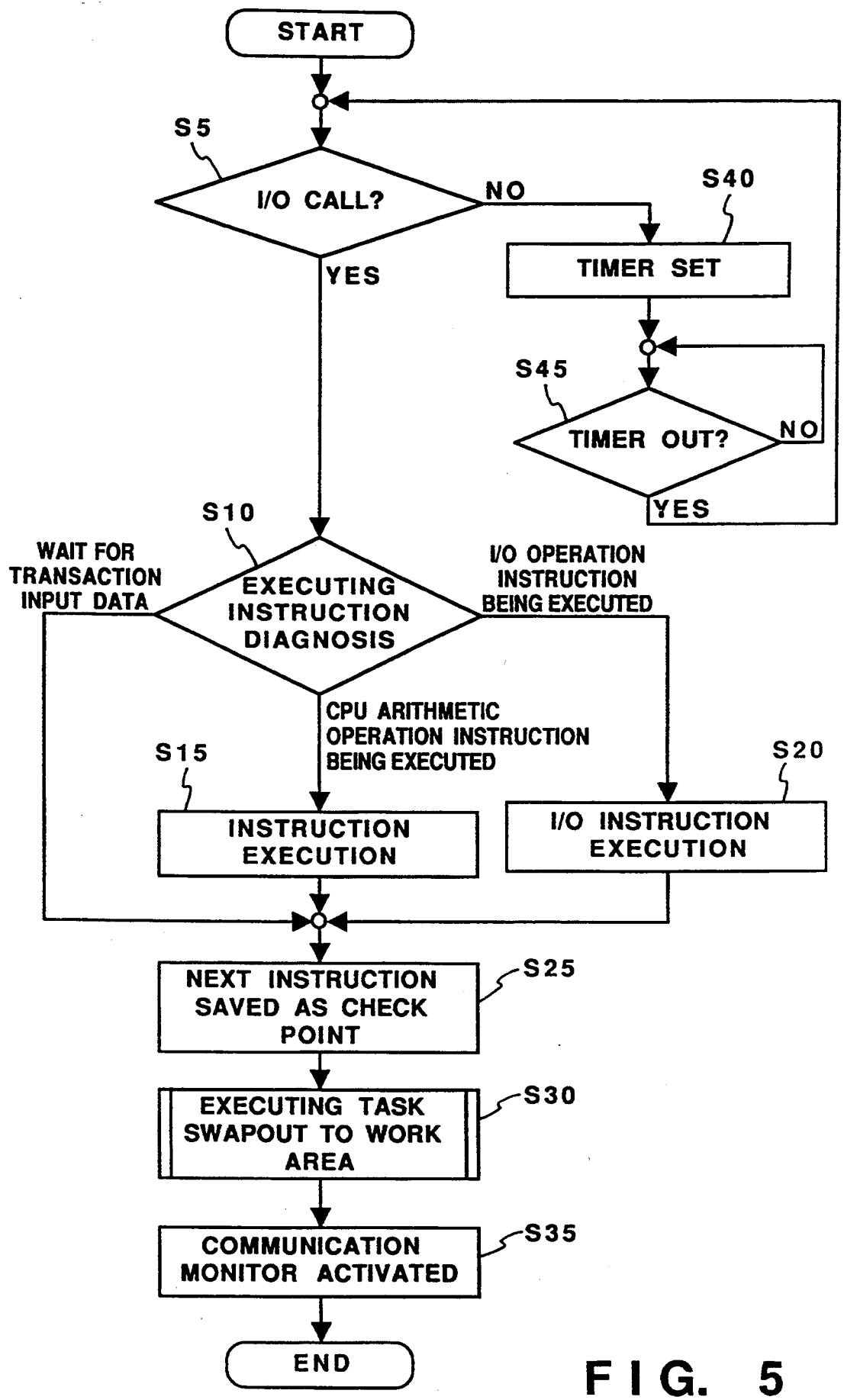
FIG. 5 is a flowchart which illustrates an application program execution freeze process at the arrival of incoming call according to the first embodiment.

First Embodiment (FIG. 4–FIG. 6)

According to the first embodiment, the telephone apparatus in case of being operated as an intelligence function, that is, as a personal computer function of the above-described multi-function telephone apparatus will now be described. More particularly, it will be described how the personal computer function is operated in the multi-function telephone apparatus while the conventional telephone function is being retained.

The telephone, according to the first embodiment, is operated in a manner such that the telephone function is given priority over the personal computer function. That is, in the case where an incoming call arrives in the NCU 16, even though the personal computer function is under the operation, the MPU 11 detects it and a telephone communication is carried out by that the personal computer function is temporary suppressed. In the case where the receiver 3 is picked up or the talk key of the operation keys 4 is pushed down, even though the personal computer function is under operation, the MPU detects it and a telephone communication is carried out by that the personal computer function is temporary suppressed.

Constitution of the Function (FIG. 4)

FIG. 4 is a diagram which illustrates the constitution of the function of the telephone apparatus according to the first embodiment. The telephone apparatus basically comprises of the telephone function and the personal computer function, however, in addition to these functions, a monitor function is substantially present as a third function. The monitor function observes a state of the telephone function and the personal computer in a fixed interval (approximately 1/36 second according the present embodiment). The monitor further operates to freeze an application under the personal computer function or to recover the application at the time of incoming/outgoing call and completion of telephone communication (to be described later) in a manner such that the telephone function is given priority over the personal computer function all the time.

According to the first embodiment, the applications stored in the IC card are loaded on the RAM 12 through the IC card reader.

Application Freeze and Recovery Processes (FIGS. 5 and 6)

Accompanying the flowcharts shown in FIGS. 5 and 6, the following processes in a program execution using the personal computer function in the above described telephone apparatus are described below:

(1) process to freeze the application program and to return to the telephone function in the case of an incoming/outgoing call; and (2) process to recover the application program in case of completion of telephone communication.

Further, the provision in this description is that an application is being operated and some step of the application is being executed.

First, process in the case of arrival of an incoming call will be described with accompanying the flowchart shown in FIG. 5. It is considered that there are basically three states in the application being executed at any time:

(a) state that a transaction is completed and another data input is being waited;

(b) state that a CPU operational process (for example, an arithmetic operation) is being executed between the MPU and a memory by some instruction; and (c) state that an input/output process to and from the external storage device (IC card in the present embodiment) is being executed.

The provision for the following description is that there is an incoming/outgoing call at the one of the above three states.

In step S5, it is examined whether there is an incoming/outgoing call in the NCU 16. If there is no call in the NCU, the process proceeds to step S40 where a timer is set. Then, the process proceeds to step S45 where a fixed period (approximately 1/36 second in the present embodiment) is being waited and the process returns to step S5.

On the other hand, if an incoming/outgoing call is detected, the process proceeds to step S10. In step S10, the kind of the instruction being executed is discriminated. In the case where the result (a) is discriminated as a state of that the data input is being waited, the process proceeds to step S25. In the case where the result (b) is discriminated as a state of that the CPU operation is being executed. Further, in the case where the result (c) is discriminated as a state of that the instruction of the input/output operation is being executed, the process proceeds to step S20.

In step S15, the CPU operation is completed by the detected instruction. On the other hand, in step S20, the execution input/output operation is completed by the detected instruction. The "completion of input/output operation" here is not only completion of an instruction of "WRITE" or "READ," but also completion of data input/output. That is, it is a state that a completion of data input/output to the external input/output storage device (IC card in the present embodiment) corresponding to WRITE check or READ check instruction is recognized by the MPU 11. In step S25, the instruction which will be executed after that the instruction detected in step S10 is saved as a check point. Further, in step S30, a task being executed is swapout to the work area of the RAM 12 with other information needed for restarting the execution.

Finally, in step S35, the communication monitor of the telephone is activated and the process is completed.

Then, accompanying with the flowchart shown in FIG. 6, an application recovery at the completion of the telephone communication is described.

First, in step S50, it is examined in the NCU 16 whether the telephone communication is completed. The completion of the telephone communication is detected, for example, when the NCU 16 detects that the receiver 3 is returned to a hook via the communication unit 21. In the case where it is discriminated that the communication is still continuing, the process proceeds to step S80 where the timer is set. In step S85, a fixed period (approximately 1/36 second in the present embodiment) is waited, and then, the process returns to step S 50.

On the other hand, when it is discriminated that the communication is completed, the process proceeds to step S55. In step S55, the task which was swapout to the work area of the RAM 12 is returned to an executable state. Then, in step S60, the check point saved in step S25 is searched and the instruction to restart the execution is detected. In step S65, the execution of the task is restarted.

At last, in step S70, the incoming/outgoing detection monitor is activated and the process is completed.

In accordance with the present embodiment, the data integrity is preserved regardless of the state of the application being executed and the application can be suppressed and recovered at the completion of the telephone communication. Further, after the completion of the telephone communication, the application can be returned to the state when it was suppressed. Therefore, the telephone can be used for the purpose of the telephone communication at any time regardless of the state of the application execution.

Second Embodiment (FIG. 7–FIG. 10)

In the second embodiment, it is described that the telephone functions as an intelligence function of the above mentioned multi-function telephone apparatus, that is, as a terminal which is connected to an external host computer (hereinafter referred to as "host") through the telephone line. In the following description, it is supposed that the present telephone apparatus is operated as a terminal of the host system whereby the labor control system is employed. Further, it is described how the telephone function and the terminal function are operated by sharing the resource of the multi-function telephone apparatus and a telephone line.

According to the second embodiment, the IC card 22 which stores an emulation program (hereinafter referred to as "emulator"), functioning as PROM, is attached to the IC card slot 6. This emulator operates the telephone as a terminal of the labor management system. On the other hand, an IC card 23 which is an identification card (hereinafter referred to as "ID card") possessed by each employee is attached to the IC card slot 7. The IC card 23 is employed only when information on employees' in/out is inputted or outputted. A plurality of different ID cards are alternately inserted into the IC card slot 7.

According to the present embodiment, the telephone apparatus daily opens a session to the host of the labor management system by automatic dialling at the predetermined time based on the fixed schedule set in the emulator. The telephone apparatus also transmits the whole information on employees' in/out which read from the IC card slot 7 in the fixed period. At this time, in the case where a communication function of the telephone apparatus is occupied, the communication with the host is on waiting and an automatic dialling is performed to the host when the telephone communication is completed. Further, in the case where an incoming call is arrived when the session is open, the telephone gives a busy signal, as a conventional telephone, until the communication with the host is completed. In a similar way, in the case where the receiver is picked up or a talk key of the operational keys 4 is pushed when the session is open, the communication function is not operated and cannot be used until the session to the host is terminated.

Figure 7:
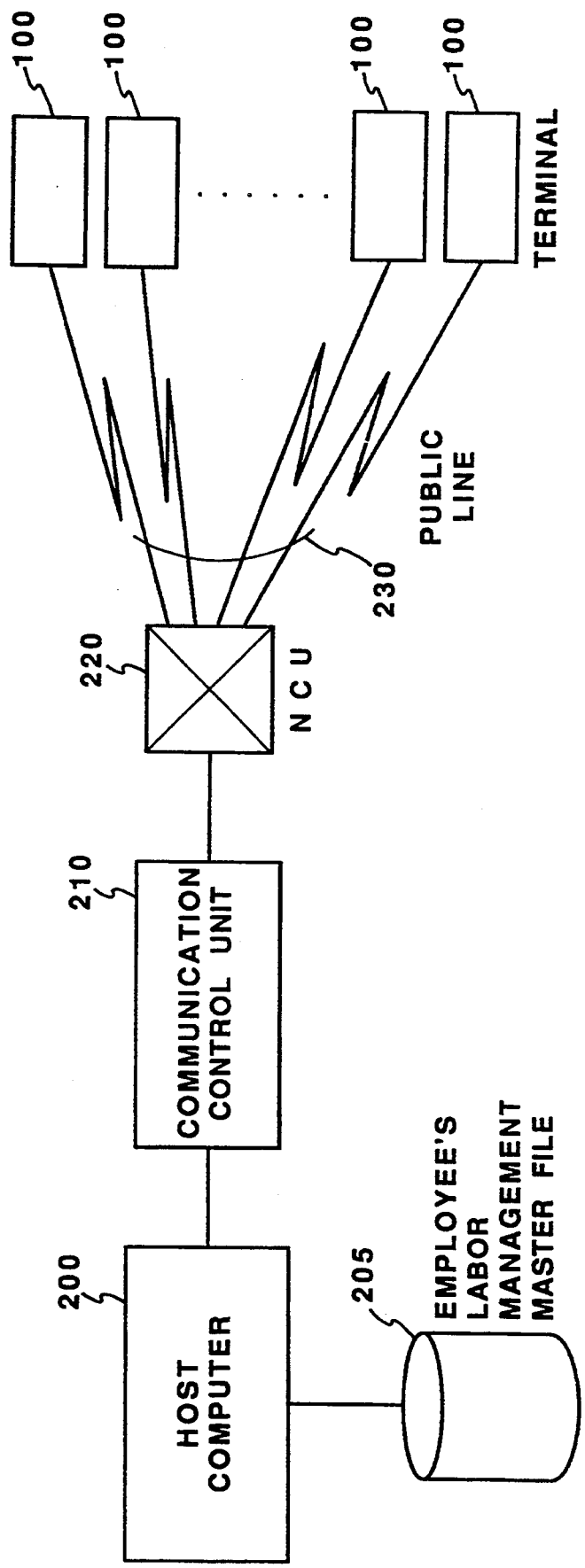
FIG. 7 is a block diagram which illustrates the constitution of the labor management system according to the second embodiment.

Outline of the Labor Management System (FIG. 7)

FIG. 7 is a block diagram which illustrates an outline of the above described labor management system. As FIG. 7 shows, the labor management system is comprising a plurality of the telephone apparatus 100 having a terminal function of the above described constitution and the host system which manages the employee's working-hour and the like. In the host system, the host 200 controls the employee's labor management master file 205 which manages the information on employee's work performances. The communication with the telephone apparatus 100 is executed by the communication control unit 210 dedicated to the host through the NCU 220 and the public line 230. The communication controls unit 210 manages a plurality of public lines 230 (a plurality of dials) for concurrent communication with a plurality of terminals (that is, a plurality of the telephone apparatus 100).

According to the present embodiment, the host system is structured as a well known art and the host can communicate with the telephone apparatus 100 based on a predetermined communication protocol.

Figure 8:
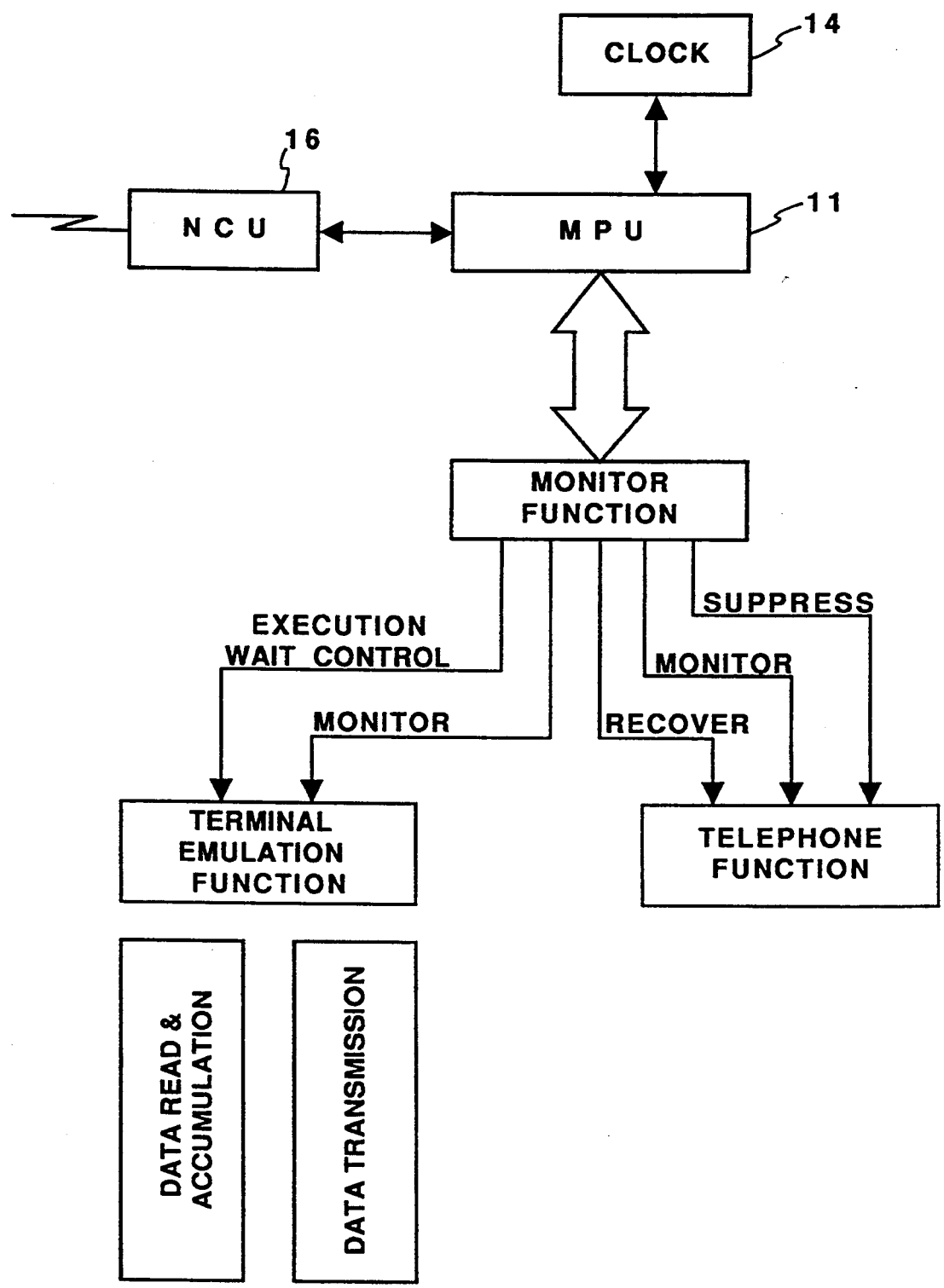
FIG. 8 is a block diagram which illustrates the constitution of the function of the telephone apparatus according to the second embodiment.

Functional description of a terminal of the Labor Management System (FIG. 8)

FIG. 8 is a diagram which illustrates an outline of the function according to the present embodiment. Basically speaking, the telephone apparatus is comprising of the telephone function and the terminal function, however, there exists a monitor function as a third function for supervising the above mentioned two functions. The monitor supervises a state of the telephone function and the terminal function in fixed interval (approximately 1/36 second according to the present embodiment).

The terminal function, which will be described later, is comprising of the two functions:

(1) reading data and accumulating process; and
(2) data transmission process.

Since one of these functions, the function (1), is a process which does not occupy the communication line, the monitor function controls so that the telephone function can be simultaneously operated during the period of the execution process of the data reading and data accumulation. On the other hand, since an execution of the data transmission process occupies the communication line, the monitor function performs the following control. That is, in the case where the communication lines are occupied by the telephone function at the time that the execution of the data transmission process is started, the monitor function controls the terminal function so that the telephone communication is given priority over the data transmission. At this time, the monitor function controls so that the terminal function (the data transmission process) becomes on waiting. Further, the monitor function controls so that the telephone function cannot be used until the data transmission process is completed even when a telephone user picked up the receiver 3 or pushed down the talk key of the operation keys 4 during the execution of the data transmission process. Similarly, even if someone called and the incoming call was arrived, the telephone gives a busy signal until the data transmission process is completed.

Figure 9:
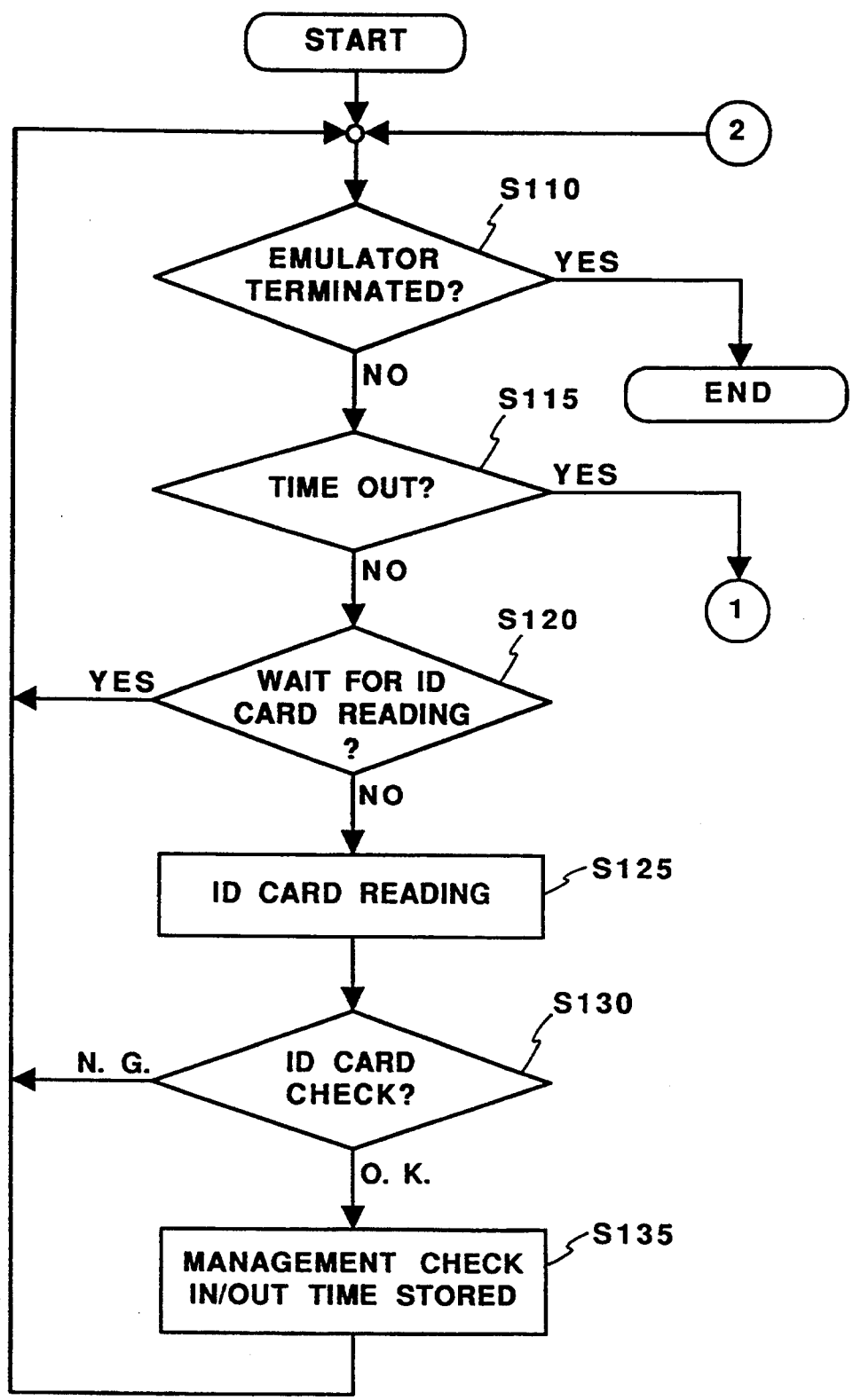
FIG. 9 and FIG. 10 are flowcharts which illustrates the processes of the labor management system at the terminal side according to the second embodiment.
Figure 10:
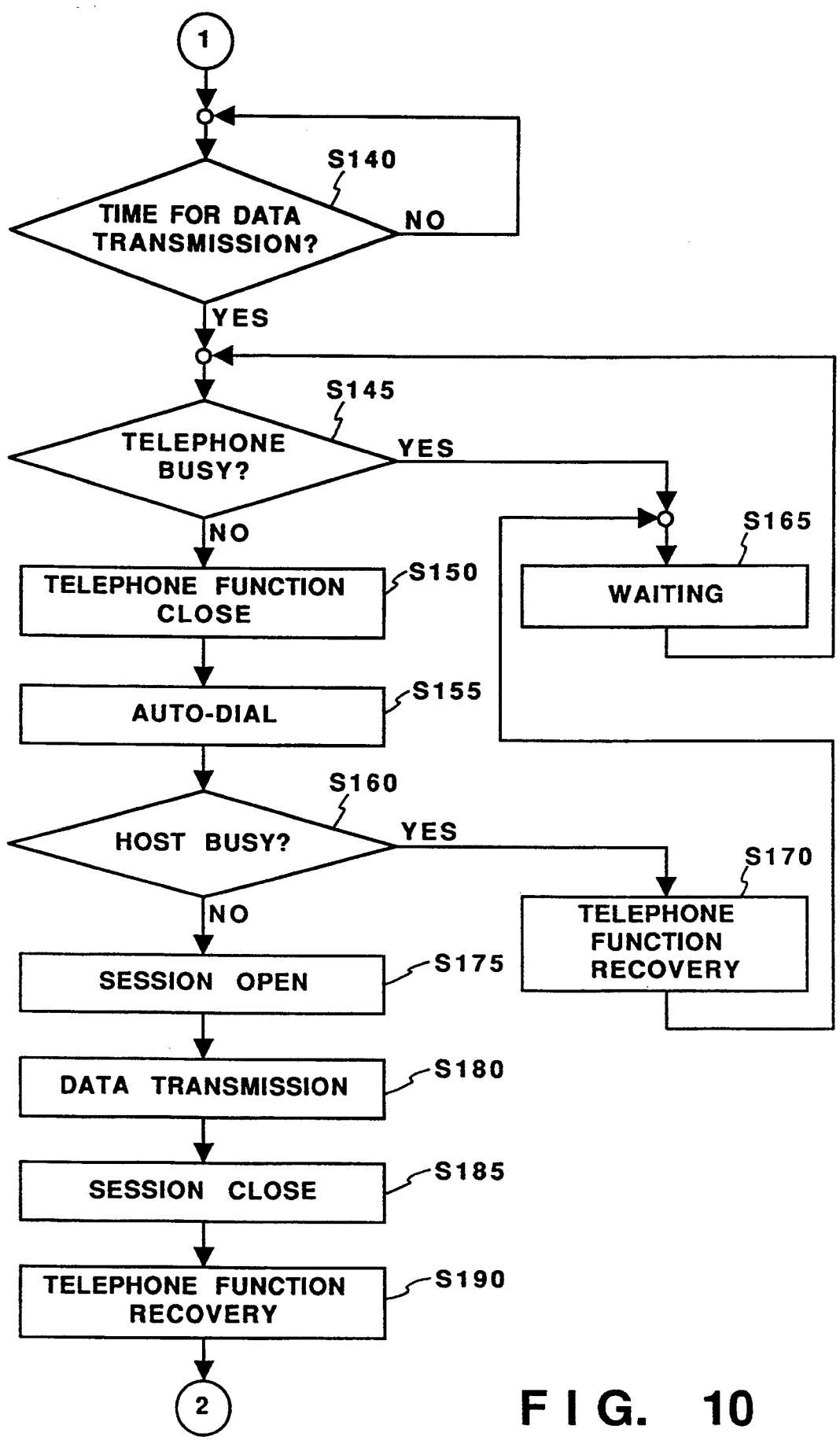

Processing in the Terminal Side of the Labor Management System (FIGS. 9 and 10)

Accompanying the flowcharts shown in FIGS. 9 and 10, the processing in the terminal side when the telephone in the above described constitution is operated as a terminal of the labor management system is now described. The provision here is that the IC card 22 operated as PROM which stores the emulator is attached to the IC card slot 6 and the telephone apparatus has already been emulated as a terminal. In the flowcharts in FIGS. 9 and 10, the terminal processing is comprising:

(a) ID card reading in a fixed period and the managerial information accumulation (steps S110–S135),
(b) the telephone function freeze and automatic dialling (steps S140–S170); and
(c) data transmitting (steps S175–S190)

(a) ID card reading in a fixed period and the managerial information accumulation First, whether a terminal emulation is terminated is checked in step S110. The terminal emulation can be terminated when a fixed key of the operation keys 4 is pushed down. If it is discriminated that the terminal emulation is terminated, the terminal process is completed. On the other hand, in the case where the terminal emulation is continued, the process proceeds to step S115. In step S115, it is checked if a current time is in the ID card readable period. This period depends on a policy of core working time in each corporation employed the present system. The processing step is based on one's point of view that there are periods for check-in (including late coming) and check-out (including leaving office earlier than usual or over-time work). For example, if in a corporation in which employee's working-hour is from 9 a.m. to 5 p.m., a time until noon can be regarded as "present" (a time after that can be regarded as "absent"). In this case, the ID card readable period is from 8 a.m. to noon. If it is discriminated that the time is in this period, the process proceeds to step S120 where the ID card is to be read. On the other hand, if it is discriminated that the time is not in this period (that is, "time-out"), the process proceeds to step S140.

In step S120, in the case where there is no ID card to be read, the process returns to step S110. On the other hand, in the case where there is an ID card to be read, the process proceeds to step S125 and the information on the ID card which is inserted into the IC card slot 7 is read. Then, in step S130, it is checked if the read information is for the labor management. If the read information is discriminated as the information from other kind of IC card, it is further discriminated as "invalid information." Then, the rest of processes are not processed and the process returns to step S110. On the other hand, if the read information is discriminated as a "valid information," the process proceeds to step S135. In step S135, the information read from the IC card and the time (when the IC card is read) can be read as an employee's check-in/check-out time and this information is stored in the RAM 12.

(b) Telephone function freeze and automatic dialing

In step S140, data transmission to the host is being waited. If a time monitor in the clock 14 discriminated that it is time for data transmission, the process proceeds to step S145. In step S145, it is examined whether the telephone is busy. If it is busy, the process proceeds to step S165 where a fixed period is waited and the process again returns to step S145. On the other hand, if it is discriminated that the telephone is not busy, the process proceeds to step S150 where the telephone function is closed. Further, in step S155, an auto-dial to the host is performed.

Now in step S160, it is checked if the host is available. If the host is not available, the process proceeds to S170. Then, the communication function is recovered and the the process returns to step S165 where a fixed period is waited and the process again returns to step S145. On the other hand, if the host is available, the process proceeds to step 175.

(c) Data Transmission

In step S175, after the confirmation of the line connection with the host, the session is opened for the communication program of the host and the emulator of the terminal and the emulator is logically connected to the host. In step S180, the information on the lobar management stored in the RAM 12 is transmitted to the host system. In step S185, after the completion of the data transmission is confirmed, the session to the heat is closed. After that, the connection of the communication with the host is disconnected and the communication function which was suppressed is recovered in step S190. The process, then, returns to step S110.

According to the present embodiments, the information on the labor management is read when the IC card, which is employed as an ID card possessed by each employee, is inserted into the IC card slot 7 of the terminal. The read information is accumulated and transmitted to the host, which manages the information on the labor management. This transmission is performed at the fixes time if the communication line is available.

Accordingly, the information is read without using any dedicated IC card readers and an inexpensive system can be produced. Further, since the data transmission is waited until the communication line becomes available, even it is after the fixed time, the communication line load will not be increased and the lines are efficiently used.

So far, the telephone apparatus having a terminal function of the labor management system has been described in the present embodiments. However, as it will be realized, the invention is capable of other different embodiments, and its several details are capable of modifications in various, obvious aspects all without departing from the invention. For example, the IC card 22, which is operated as PROM storing the emulator program, can be replaced by the other IC card (not shown), which stores other application program (other emulation program). The IC card (not shown) is loaded and operated as a terminal of other system. More particularly, in a hospital belonging to some corporation, it is possible to display information on each employee's health condition on the screen of the telephone apparatus when an employee's ID card is inserted in the slot and connected to the host computer which manages the information on the employees' health condition in the hospital.

Further, it is also possible to constitute a structure so that input devices such as a typewriter keyboard and a bar-code reader can be attached to one of a plurality of the IC card slots (two slots according to the present embodiments) through a connector corresponding to other interface (for example, RS-232C) and an IC card which stores application programs and emulator programs is inserted into another IC card slot. Also, the IC card can be an IC memory card.

Accordingly, the information is read without using any dedicated IC card readers and an inexpensive system can be produced. Further, since the data transmission is waited until the communication line becomes available, even it is after the fixed time, the communication line load will not be increased and the lines are efficiently used.

As many apparently widely different embodiments of the present invention can be made without departing from the spirit and scope thereof, it is to be understood that the invention is not limited to the specific embodiments thereof except as defined in the claims.

What is claimed is:

1. A multi-function telephone apparatus connected to a public telephone line, having execution means for executing any desired program, which is functionally independent of voice communication, by sharing hardware resources with the voice communication, comprising:
    detection means for detecting an incoming/outgoing call and a completion of a voice communication;
    means for determining a state of the program being executed by said execution means when the incoming/outgoing call is detected by said detection means;
    means for completing, in response to the means for determining, a currently executing instruction of the program;
    means for halting execution of the program after the currently executing instruction is completed, and holding information relating to an instruction to be subsequently executed so that a halting point in the program can be identified and the voice communication immediately becomes available in accordance with the detection by said detection means; and restart means for automatically restarting, based on the held information, the execution of the halted program from the halting point so that the program can be recovered immediately after it is detected by said detection means that the telephone communication is completed, wherein said execution means is integrated in the apparatus.

2. The apparatus according to claim 1, wherein said detection means checks an incoming/outgoing call and a completion of the voice communication at a predetermined interval.

3. The apparatus according to claim 1, wherein said means for halting includes storage means for storing information related to the halting point.

4. The apparatus according to claim 1, wherein said determining means determines a state in the program being executed, at least, where a transaction of the program being executed is waiting for input data, where it is in execution of an arithmetic operation, or where it is in input/output operation.

5. The apparatus according to claim 1, wherein said execution means includes external interface means for loading the program to be executed from an external exchangeable storage medium, wherein the external exchangeable storage medium is an IC card and the IC card can store both the program and the necessary data for the execution of the program.

6. The apparatus according to claim 5, wherein said external interface means is capable of simultaneously handling a plurality of IC cards, and/or connecting to another data input/output device.

7. A control method of a multi-function telephone apparatus connected to a public telephone line, capable of executing any desired program by a circuit integrated in the apparatus, which is functionally independent of voice communication, by sharing hardware resources with the voice communication, comprising the steps of:

executing the program;
detecting an incoming/outgoing call;
determining a state of the program being executed when an incoming/outgoing call is detected;
completing, in response to the determination, a currently executing instruction of the program;
halting execution of the program after the completion of the currently executing instruction, and holding information relating to an instruction to be subsequently executed so that a halting point in the program can be identified and voice communication immediately becomes available;
detecting a completion of the voice communication; and
automatically restarting the execution, based on the held information, of the halted program from the halting point so that the program can be recovered immediately after it is detected that the voice communication is completed.

8. A multi-function telephone apparatus having terminal function which is operated as a terminal of a remote host computer system through a communication line, sharing the communication line with a telephone function, comprising:

terminal emulation means for emulating the terminal under the remote host computer system, inputting information and transmitting the information to the remote host computer system;

supervising means for supervising the terminal emulation and the telephone function by detecting an execution state in the telephone function and the terminal function;

scheduling means for scheduling communication with the remote host computer system by said terminal emulating means;

controlling means for controlling the communication with the remote host computer system in a manner such that the communication with the remote host computer system by said terminal emulation means becomes on hold even though the communication with the remote host computer system is scheduled by said scheduling means, in the case that said supervising means detects that the telephone function is used and the communication line is busy; and halting means for halting the telephone function in the case where it is determined that said terminal emulation means is communicating with the remote host computer system, wherein said scheduling means presets a time of communicating with the remote host computer system in accordance with a predetermined fixed time when the communication line is not so busy, so that a conflict of a telephone call with the communication with the remote host computer system can greatly be avoided, said control means controls said scheduling means in a manner such that said scheduling means reschedules another time for communicating with the remote host computer system a predetermined period later in a case where the preset time of communicating with the remote host computer system conflicts with a use of the telephone function and the communication line is busy and said terminal emulation means includes:
reading means capable of reading a plurality of exchangeable IC cards wherein each IC card stores an emulation program for executing emulation and information input as a terminal of the remote host computer system;
execution means for executing the emulation program so as to emulate the terminal;
storage means for temporarily storing the input information; and
transmission means for transmitting the input information stored in said storage means to the remote host computer system.

9. The apparatus according to claim 8, wherein the execution of the terminal emulation by said terminal emulation means and the execution of the telephone function can concurrently be performed except for the period of the communication with the remote host computer system by said terminal emulation means.

10. The apparatus according to claim 8, wherein said reading means is an IC card reader.

11. The apparatus according to claim 8, wherein said terminal emulation means is capable of emulating various kinds of terminals by exchanging the IC card with another IC card which stores the program to emulate various kinds of terminals.

12. A control method of the multi-function telephone apparatus having terminal function which is operated as a terminal of a remote host computer system through a communication line, sharing the communication line with telephone function, comprising the steps of:

terminal emulation step which emulates terminals under the remote host computer system, inputs information and transmit the information to the remote host computer system;

supervising step which supervises the terminal emulation by said emulation step and the telephone function by detecting an execution state of the telephone function and the terminal function;

scheduling step which schedules a communication with the remote host computer system by said terminal emulation step;

controlling step which controls the communication with the remote host computer system by said terminal emulate step in a manner such that the communication with the remote host computer system becomes on hold, even thought he communication with the remote host computer system is scheduled by the scheduling step, in the case where it is detected by said supervising step that the telephone function is used and the communication line is busy; and freezing step which freezes the communication function in the case where the communication with the remote host computer system is confirmed, wherein said scheduling step presets a time for communicating with the remote host computer system in accordance with a predetermined fixed time when the communication line is not so busy, so that a conflict of a telephone call with the communication with the remote host computer system can greatly be avoided, said control step controls said scheduling step in a manner such that said scheduling step reschedules another time for communicating with the remote host computer system a predetermined period later in a case where the present time for communicating with the remote host computer system conflicts with a use of the telephone function and the communication line is busy, and said terminal emulation step includes the steps of reading an exchangeable IC card which stores an emulation program for executing emulation and information input as a terminal of the remote host computer system;

executing the emulation program so as to emulate the terminal;

temporarily storing the input information; and transmitting the temporarily stored input information to the remote host computer system.

13. The apparatus according to claim 8, wherein said reading means includes an interface means for inputting information from an input device other than the IC card.

14. The apparatus according to claim 13, wherein said input device includes a typewriter keyboard or a barcode reader.

* * * * *